(No Model.)

W. B. HOSFORD.
CLUTCH SHIFTER.

No. 506,113. Patented Oct. 3, 1893.

Old Construction

Attest
Aug. Hoerstmann
E. W. Gill

Inventor
William B. Hosford
By his Atty
R. S. S. Smith

UNITED STATES PATENT OFFICE.

WILLIAM B. HOSFORD, OF MISHAWAKA, INDIANA.

CLUTCH-SHIFTER.

SPECIFICATION forming part of Letters Patent No. 506,113, dated October 3, 1893.

Application filed December 17, 1892. Serial No. 455,513. (No model.)

*To all whom it may concern:*

Be it known that I, WILLIAM B. HOSFORD, of Mishawaka, in the county of St. Joseph and State of Indiana, have invented a new and useful Improvement in Clutch-Shifters; and I do hereby declare that the following is a full and accurate description of the same, reference being had to the accompanying drawings, wherein—

Figure 1:
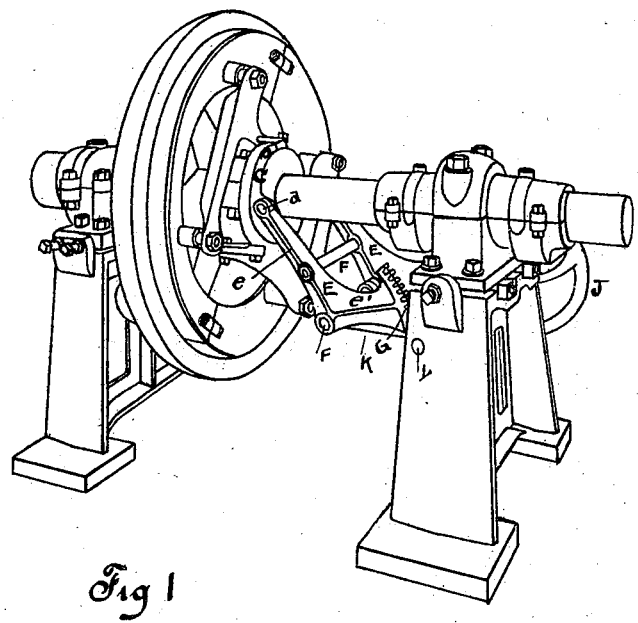
Figure 2:
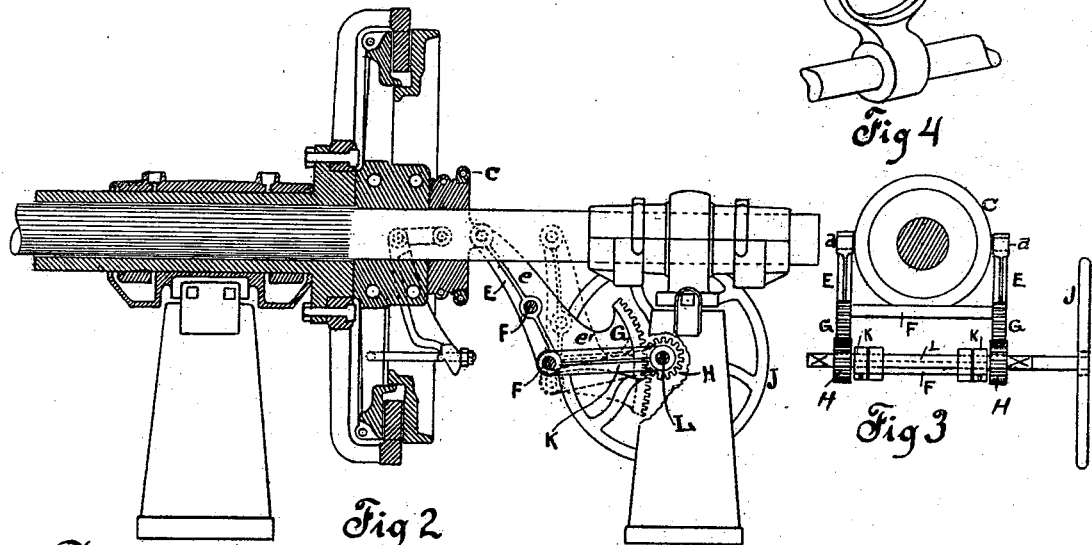
Figure 4:
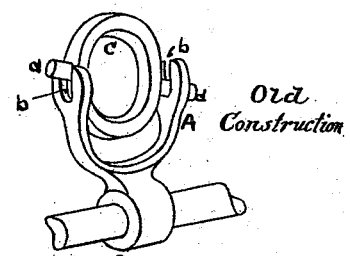
Figure 3:
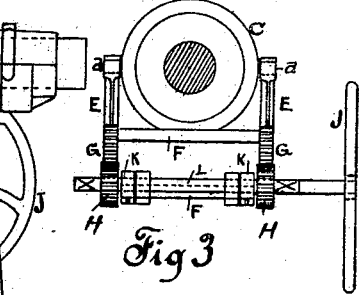

Figure 1 is a perspective view of my invention in action. Fig. 2 is a longitudinal sectional elevation of the same. Fig. 3 is a front elevation of the same. Fig. 4 is a perspective view showing the ordinary clutch shifter fork and the evil corrected by my invention.

The clutch fork A, as commonly employed, is shown in Fig. 4. It is pivoted by being placed on a shaft as in Fig. 4, or otherwise, and is provided with compensating slots $b.\ b.$ in the extremities of the arms. The shifter ring C is provided with trunnions $d.\ d.$ which rest in the slots $b.\ b.$, and thereby the shifter ring and the clutch collar are moved when the fork A is swung on its pivot. To compensate for the circular swing of the pivoted clutch fork, it is usual that the trunnions $d.\ d.$ shall rest in slots and have freedom to assume the positions therein shown in Fig. 4, to wit: one trunnion at the outer end of its slot, and the other at the inner end of its slot, the revolution of the clutch collar tending to place them in said positions. It is plain that the outer and inner ends of the slot $b$ move in circular arcs, having dissimilar radii, and that therefore the motion of the fork A will seek to move one trunnion faster than the other, but this being impossible the result is a cramp which can only be relieved by a partial revolution of the ring C to place the trunnions in similar positions in their slots. As a matter of fact, this partial revolution is frequently very hard to accomplish, and hence, the movement of the clutch is greatly obstructed, and this is especially true of clutches of the larger sizes. My invention obviates these difficulties by a structure of the clutch controlling devices, which renders it impossible for the trunnions to become displaced and cramped, as described and shown in Fig. 4, and at the same time furnishes a very convenient, compact and powerful means for shifting a heavy clutch member. This is accomplished by a shifter pivoted to the clutch collar and provided with a movable fulcrum and means for restraining motion in a plane transverse to the shaft axis. I provide the clutch ring C or the movable clutch member with trunnions $d.\ d.$, as usual. To this ring, collar or member I connect pivotally and positively, so that none but a rotary movement of one part relative to the other can take place, a shifter-lever of suitable rigid construction. This shifter I preferably construct with two arms at an angle to each other, or extending in different directions, the one $e$ at an angle to the main shaft and to the line of movement of the clutch member, and the other $e'$ extending in a direction longitudinally (though not necessarily parallel) with the said shaft and line of movement. In the particular embodiment of my invention which I have illustrated I have constructed it of a rigid frame composed of side members E. E., and cross bars or braces F F. The side members E have a pivoted connection with the trunnions $d.\ d.$ and hang therefrom. The side members E. E. are provided with a movable fulcrum which will permit the pivoted extremities to move in a straight line, and at their lower extremities with means whereby force may be applied to move them. In the construction illustrated said means consists of toothed racks G which mesh with the pinions H on the shaft L, and said members E are maintained in operative connections with said pinions by means of the links K, which carry a floating fulcrum for said members E. The connection of the racks G with the pinions H is an effectual restrainer against displacement in a plane transverse to the axis of the shaft, but such restraint may be secured by a variety of mechanical means, which will occur to any skilled mechanic when the need is suggested. The shifter frame composed of said side members in the relation described, operated by the pinion H, with hand wheel J, becomes a power apparatus, the leverages of which may be arranged as required for any particular case, and caused to exert any required pressure upon the clutch collar, to move the clutch into or out of action whatever may be the pressure of the friction faces and any interference with the operative force by reason of the cramp as above described, is entirely obviated.

Having described my invention, I claim as new—

1. In a clutch shifter the combination, with the collar or clutch member to be shifted, of a shifter lever having arms at an angle to each other and extending the one at an angle to the line of movement of said collar, and the other substantially in the direction of said line of movement, the former arm being pivoted positively to said collar, and the latter arm being adapted to be moved toward and from the shaft to shift the clutch, a floating fulcrum for said shifter lever, and a power device having its support or bearings connected with said floating fulcrum and having an actuating movement in a direction toward and from the first mentioned line of movement and transversely of said latter lever arm, said power device having an operative connection with said latter arm, substantially as set forth.

2. In a clutch shifter the combination, with the collar or clutch member to be shifted, of a shifter lever having arms at an angle to each other extending the one at an angle to the line of movement of said collar and the other substantially in the direction of said line of movement, the former arm being pivoted positively to said collar, and the latter arm being provided with a gear or segment, a floating fulcrum for said shifter lever and a rotary power device adapted to engage the teeth of said gear or segment for operating the shifter lever upon its fulcrum, substantially as set forth.

3. In a clutch shifter the combination, with the collar or clutch member to be shifted, of a shifter lever having arms at an angle to each other and extending the one at an angle to the line of movement of said collar and the other substantially in the direction of said line of movement, the former arm being pivoted positively to said collar and a gear or segment being mounted upon the latter arm, links carrying a floating fulcrum for said shifter lever, a shaft or pivot L constituting a fixed hinge point for said links, and a rotary power device engaging said gear or segment for operating the shifter lever, said device being situated in line with said shaft or pivot L, substantially as set forth.

4. In a clutch shifter the combination, with the collar or clutch member to be shifted, of a shifter lever, a movable part such as a link K carrying a floating fulcrum to said lever, and a power device for operating the lever, said device being connected with the part K whereby the power device and fulcrum are held in constant proper relation to each other, substantially as set forth.

5. In a clutch shifter the combination, with the collar or clutch member to be shifted, of a shifter lever connected positively with said clutch member and provided with a gear or segment, a movable part such as a link K carrying a floating fulcrum for said lever, a shaft L on which said link is mounted and adapted to turn, and a pinion on said shaft engaging said gear or segment for operating the clutch shifter, substantially as set forth.

6. A clutch collar C, a shifter composed of side members E and brace bars F and segment racks G, combined with the links K K carrying a floating fulcrum for said side members, shaft L and pinions H.

W. B. HOSFORD.

Witnesses:
D. O. FONDA,
C. W. GILL.